United States Patent [19]

Laymaster

[11] Patent Number: 4,811,936
[45] Date of Patent: Mar. 14, 1989

[54] WIRE VISE

[76] Inventor: Larry A. Laymaster, P.O. Box 421, Xenia, Ohio 45385

[21] Appl. No.: 119,921

[22] Filed: Nov. 13, 1987

[51] Int. Cl.$^4$ .............................................. B25B 1/20
[52] U.S. Cl. ...................................... 269/43; 269/87; 269/902; 29/281.5
[58] Field of Search .................. 269/43, 902, 254 CS, 269/87-87.2, 253, 236; 228/44.5, 44.3, 44.7, 49.3

[56] References Cited

U.S. PATENT DOCUMENTS

| | | | |
|---|---|---|---|
| 731,665 | 7/1903 | Clayton | 269/43 |
| 1,916,556 | 7/1933 | Butt | 269/43 |
| 2,105,954 | 1/1938 | Rippe | 269/43 |
| 2,638,676 | 5/1953 | Callahan | 269/43 |
| 4,054,984 | 10/1977 | Ball et al. | 269/43 |
| 4,650,379 | 3/1987 | Joskolski | 269/43 |

FOREIGN PATENT DOCUMENTS 376757  7/1932  United Kingdom ................. 269/43

Primary Examiner—Robert C. Watson
Attorney, Agent, or Firm—Biebel, French & Nauman

[57] ABSTRACT

A device for facilitating the welding together of pieces of welding wire comprises a pair of complementary vise units which are connected together for relative linear movement and are spring-loaded toward a limit position in contact with each other. In use, two pieces of welding wire are clamped in the respective vise units in such relative positions that they are in end to end contact while the vise units are separated from their limit position against their spring loading. Welding current is then applied to the junction of the wires until they are sufficiently softened for the spring-loading of the device to force their softened ends together and thereby to complete the welded joint therebetween.

10 Claims, 2 Drawing Sheets

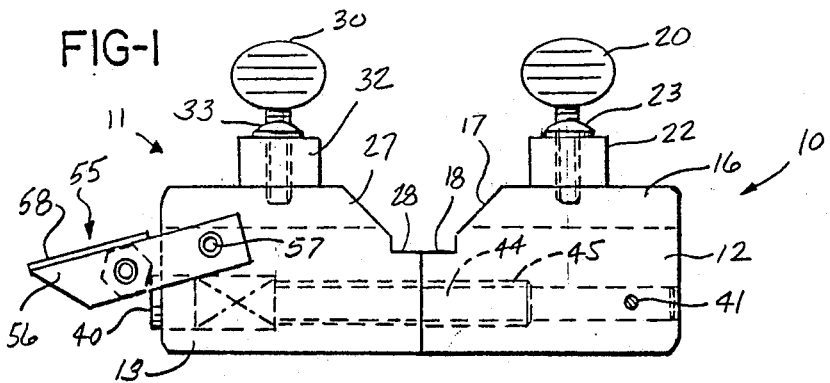
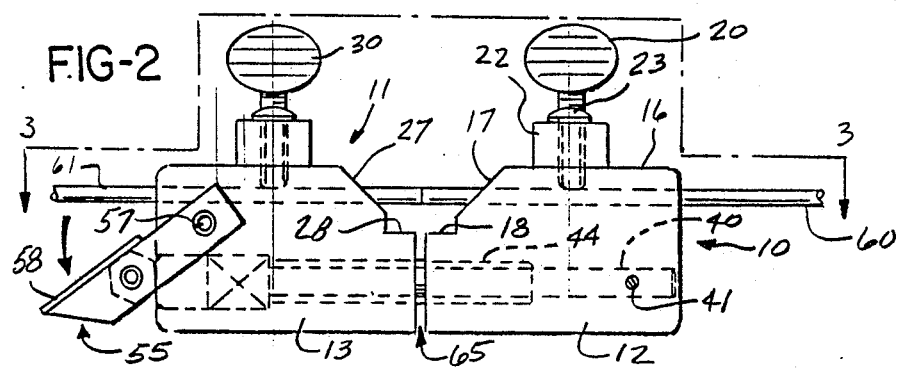
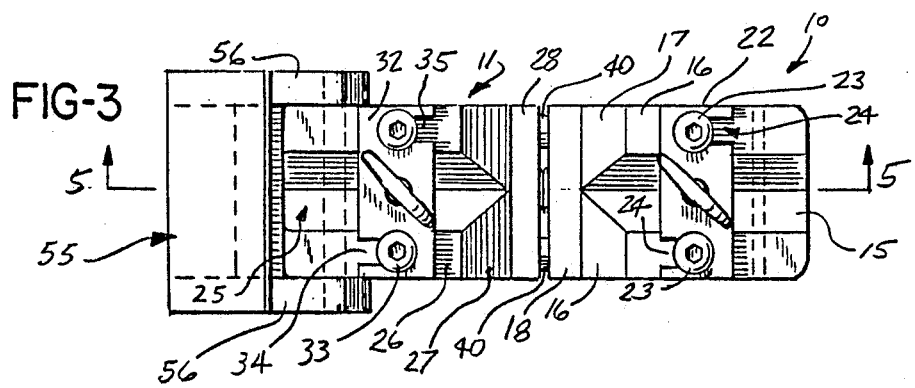

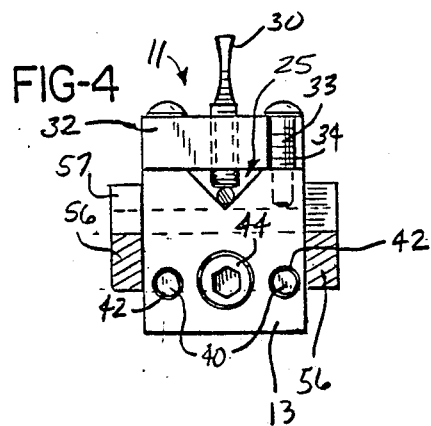
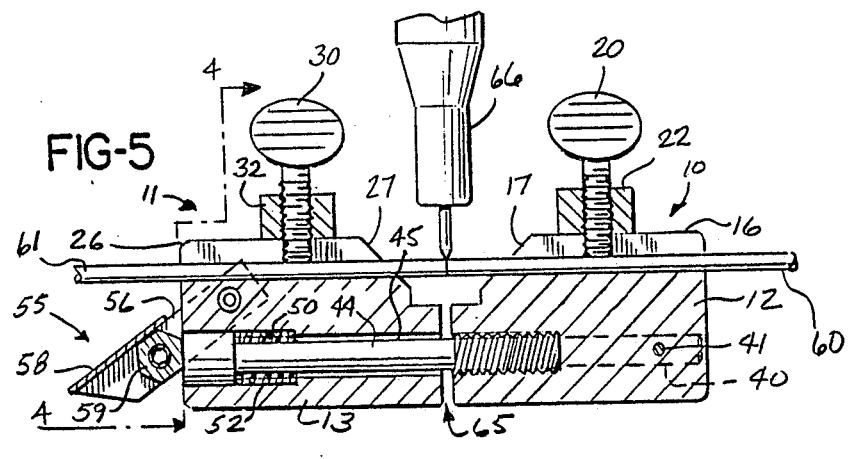

WIRE VISE

BACKGROUND OF THE INVENTION

In heliarc and similar types of welding, it is common to use what the industry calls "exotic metal" welding wire which not only is comparatively expensive, but also is usually marketed in relatively short lengths rather than in a coil such as is conventional practice with relatively low cost welding wire. For example, Stellite welding wire is normally marketed only in 12-inch lengths and at a cost of the order of $40 per pound, and welding wire containing titanium is normally sold only in 20-inch lengths at a cost of the order of $100 per pound. Even less expensive stainless steel welding wire is usually marketed only in lengths of 20-24 inches, at a cost in the range of $15-$20 per pound.

There is a practical limit to the extent to which a single piece of welding wire can be used before it becomes too short for safe handling at the temperatures to which it is heated during welding. For example, the usual practical limit is of the order of 3 inches. Any shorter piece can be used only if the welder adopts the cumbersome procedure of holding the stub wire with a pair of pliers, but that is not practically possible for a piece shorter than 2 inches, because of the excessive heat problem. Thus with welding wires of the materials and costs outlined above, the unusable portion of each piece may constitute as much as from 10% to 25% of the original length, and this necessarily means the loss of the corresponding percentage of the original cost of the wire.

The desirability of attempting to reduce or eliminate this built-in loss of welding wire and money has been recognized in the past, but to the extent of the knowledge of the present inventor, no satisfactory solution has been proposed or found. For example, it has been a usual practice for welding shops to collect the stub pieces of welding wire which were too short to use until a substantial number had been accumulated, and then to weld them in end-to-end relation into a single longer piece. However, the present inventor knows of no satisfactory technique or equipment, prior to the present invention, for carrying out such an operation.

More specifically, if the operation is attempted by arranging two pieces of welding wire on a welding table and then welding them together, it is difficult and cumbersome to hold the wire pieces in aligned and abutting relation, and the result will commonly be a relatively zig-zag length of wire which includes misshapen and/or over-sized weld joints. Further, this technique is so time-consuming that the labor cost would substantially reduce, or even fully offset, the savings represented by the value of the reclaimed pieces as compared with the cost of new full length wire pieces.

SUMMARY OF THE INVENTION

The present invention provides a device designed for the specific purpose of facilitating the welding together of pieces of welding wire under controlled conditions which will give maximum assurance of a straight and smooth welded joint. The device of the invention comprises a pair of complementary vise units which are connected together for relative linear sliding movement and are spring-loaded toward a limit position in contact with each other.

In the use of this device, the two pieces of welding wire to be joined are clamped in the respective vise units in such relative positions that they are in end to end contact with each other while the vise units are separated from their limit position against their spring loading. Welding current is then applied to the junction between the wires until they are sufficiently softened for the spring-loading of the device to force their softened tips together, thereby completing the welded joint therebetween.

These and other features and advantages of the invention will be pointed out in greater detail in connection with the description hereinafter of a preferred embodiment of the invention.

BRIEF DESCRIPTION OF THE DRAWINGS

FIG. 1 is a side elevation of one form of the device of the invention with the two vise units in their limit position of contact with each other;

FIG. 2 is a view similar to FIG. 1 showing the device with the two vise units separated to the maximum extent;

FIG. 3 is a plan view of the device looking downwardly in FIG. 2;

FIG. 4 is an end view looking from left to right in FIG. 1 and with parts broken away;

FIG. 5 is a fragmentary section on the line 5—5 of FIG. 1.

DESCRIPTION OF THE PREFERRED EMBODIMENT

The device of the invention comprises two complementary vise units 10 and 11 fabricated from initially identical blocks 12 and 13 respectively. The block 12 is provided in its upper surface with a V-groove 15 between side walls 16, each of which is provided with a bevel 17 at one end, and at that end, the block is provided with a rabbet 18 which extends below the level of the bottom of the groove 15.

A clamping screw 20 is mounted on top of the block 12 by threading through a member 22 which bridges the groove 15. The bridging member 22 is secured to block 12 by a pair of screws 23 which pass freely through slots 24 in the bridging member 22 and are threaded into the block walls 16. The slots 24 are open on opposite sides of the bridging member 22 to facilitate quick release of the clamping screw 20 under some conditions of operation as described hereinafter.

The block 13 has the same configuration as the block 12 and is provided with an identical V-groove 25 between walls 26 having beveled ends 27, and the rabbet 28 on block 13 is of the same configuration as the rabbet 18 on block 12. The clamping mechanism on block 13 is also identical with that on block 10, and it similarly comprises a clamping screw 30 threaded through a bridging member 32 which is mounted on block 13 by screws 33 in slots 34.

The vise units 10 and 11 are interconnected for relative linear movement in line with their respective V-grooves 15 and 25. More specifically, two smooth guide pins 40 are fixed in block 12, as by means of a roll pin 41, and are slidably received in cylindrical bores 42 extending through the full length of block 13. As shown in FIG. 2, when the two blocks are at their limit position of movement towards each other, in which they are in abutting contact, the pins 40 project beyond the outer end of block 13 by a predetermined amount, preferred results having been obtained with the maximum projection of pins 40 being 0.090 inch.

In addition to the pins 40, the blocks 12 and 13 are also interconnected by a cap screw 44 which passes freely through a bore 45 in block 13 and is threaded into block 12. A counterbore 50 in the outer end of block 13 receives the head of screw 44 therein and is of substantially greater depth than the axial extent of the head of screw 44 to provide space for a coil spring 52 which can thus be compressed between the head of screw 44 and the inner end of counterbore 50. The action of spring 52 is therefore to bias the two blocks towards each other, to the position of abutting contact between their opposed inner ends shown in FIG. 1.

Manual means are provided for easily separating the two blocks against the biasing action of spring 52. More specifically, a lever 55 comprises two arms 56 pivoted on opposite sides of block 13, on a pin 57 extending through the block. The lever arms 56 are also connected by a metal pad 58 and a spacer 59, which is shown as of hexagonal section and as so located on lever arms 56 that when they are pressed downwardly about their common pivotal mounting, the spacer 59 will directly engage the projecting ends of the guide pins 40.

FIG. 2 illustrates the relative positions of the vise units 10 and 11 at the start of the operation of welding together two short pieces of welding wire 60 and 61 which are clamped in these respective vise units. The first step in this set-up operation is to clamp one piece of wire, e.g. piece 60, in the vise unit 10 with the end of this wire approximately in vertical line with the inner end face of block 12. The operator then moves the lever 55 down, by finger pressure on pad 58, to its lower limit position shown in FIG. 2. During this movement, the spacer 59 will act as a cam in forcing the outer ends of guide pins 40 are substantially flush with the outer end face of block 13, thereby opening a gap 65 between the opposed inner ends of the two vise units. The second wire piece 61 is then clamped in vise unit 11 with its end abutting the previously clamped wire piece 60, after which the lever 55 released.

The two pieces of wire are now ready for the application of welded current, since they are being biased into firmly abutting end to end relation by the compressed spring 52. Welding current is then applied to the junction between the wires, as represented by the fragmentary showing of a torch 66 in FIG. 5. As soon as this current has developed enough heat at the junction of the two wires to soften the metal there, the continued biasing action of spring 52 will force the softened ends of the wires together, thereby completing the welded connection therebetween.

An important feature of the invention is that those portions of the two wires which are being welded together are spaced out of contact with any part of the vise units 10 and 11, by reason of both the bevels 17 and 27 and especially the rabbets 18 and 28 on the blocks 12 and 13, which define a channel-like space 68 underlying the abutting ends of the wires. Therefore, even if more metal should accumulate around the welded connection than is desired, as for example if the operator holds the torch in position too long, with most sizes of welding wire, the welded joint can still be pulled under one of the bridging members 22 and 32 to free it from the device.

If, however, this should not be the case, as may occur with welding wire of the larger diameters for which the device is designed, release after welding can still be effected very quickly by loosening the screws 23 or 33 and removing the associated clamp screw and bridging member. This operation is facilitated by the open ended slots 24 and 34, since the operator need only loosen one set of screws and then turn the associated bridging member about 45° and lift it out of the way. Replacement of the bridging member is equally quick and easy, by reengaging the slots with their associated screws and tightening the screws.

The proportions of the vise units 10 and 11 can of course be selected to handle any desired range of wire sizes, the commonest such range being from 0.062 to 0.250 inch in diameter. In a device as shown in the drawings capable of handling this range of wire sizes, each of blocks 12–13 may be 2 inches in length, 1.25 inches in width and also in maximum height, with each of the V-grooves having an angular extent of 90° and a maximum of 5/16 inch. With these dimensions, the beveled surfaces 17 and 27 may be at 90° to the vertical, and each of the rabbets 18 and 28 may be 3/16 inch deep and 5/16 inch wide to provide a minimum width of ⅝ inch for the channel-like space 68 when the blocks 12–13 are in contact with each other.

The distance to which the two vise units 10 and 11 can be separated is not critical, although it is desirable that this distance, and therefore the width of gap 65, be relatively small in order to limit the amount of movement which the two pieces of wire can make towards each other while their ends are softened, thereby to limit the amount of softened metal which can be forced out to the side of the welded joint. As noted above, a satisfactory maximum such dimension is 0.090 inch, and this dimension is subject to some adjustment, by turning the screw 52 in its threaded mounting in block 12, to effect corresponding adjustment of the distance which the head of this screw can move in bore 45 before it fully compresses the spring 52. A practical limitation on this adjustment is that if the head of the screw projects beyond the surrounding end face of the block 13, it would act as a stop for the spacer 59 and correspondingly prevent the ends of pins 40 from being pushed fully into bores 42.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. A device for holding two pieces of welding wire in end-to-end butted relation while they are welded together to form a single such wire, comprising
    (a) pair of metal blocks each having a longitudinal V-groove in the top thereof for receiving a piece of welding wire,
    (b) means carried by each said block for releasably clamping a piece of welding wire in said groove in said block,
    (c) means connecting said blocks with said grooves in aligned relation such that pieces of wire clamped therein are aligned with each other,
    (d) said connecting means including means providing for relative linear movement of said blocks in line with said grooves,
    (e) means including a spring carried by said blocks for continually biasing said blocks toward each other while providing for separation thereof against the force of said biasing means,
    (f) whereby when two pieces of welding wire are clamped in end-to-end butted relation in the respective said grooves while said blocks are separated against the force of said biasing means and said butted ends are softened by the application thereto of welding current, said biasing means will cause said softened ends to be urged together to complete a welded connection therebetween, and (g) means providing clearance space between the adjacent ends of said grooves for such softened metal as may increase the radial dimensions of said welded connection above the radial dimension of said wire pieces.

2. The device defined in claim 1 wherein said connecting means comprises at least one rod member fixed to one of said blocks in parallel relation with said groove therein, and a bore in the other said block parallel with said groove therein and dimensioned to receive said rod member slidably therein.

3. The device defined in claim 1 further comprising cam means on one of said blocks for effecting temporary relative separating movement of said blocks against the biasing force of said biasing means while a piece of wire is being clamped in one of said grooves in said abutted relation with a piece of wire already clamped in the other said groove.

4. The device defined in claim 2 further comprising cam means carried by said other block and cooperating with said rod member to effect temporary relative separating movement of said blocks against the biasing force of said biasing means while a piece of wire is being clamped in one of said grooves in said abutted relation with a piece of wire already clamped in the other said groove.

5. The device defined in claim 2 further comprising means establishing a limit position of the movement of said blocks toward each other, and wherein said bore extend completely through said other block, said rod member projects beyond the end of said bore when said blocks are in said limit position, and said cam means is mounted on said other block for cooperation with said projecting end of said rod member to force said blocks apart from said limit position against the force of said biasing means.

6. The device defined in claim 5 wherein said cam means comprises lever means pivotally mounted on said other block in overhanging relation with the end of said block remote from said one block for pivotal movement against said projecting end of said rod member.

7. The device defined in claim 1 wherein said clamping means carried by each said block comprises a member adapted to bridge said V-groove in said block, a clamping screw threaded through said bridging member, and means forming a quickly releasable connection between said bridging member and said block to expedite removal of said welded wires from said device.

8. The device defined in claim 6 wherein said releasable connection means comprises a screw threaded into said block on each side of said groove therein, and said bridging member has a pair of slots therein which are spaced to receive said screws therethrough and are open on one side thereof to facilitate removal of said bridging member from said block.

9. The device defined in claim 1 further comprising means establishing a limit position of the movement of said blocks towards each other, and wherein said clearance space is provided by means defining a transverse groove in at least one of said blocks which extends below the level defined by the bottoms of said V-grooves.

10. The device defined in claim 1 further comprising means establishing a limit position of the movement of said blocks towards each other, and wherein said clearance space is provided by means defining a transverse groove in each of said blocks which extends vertically to a level below the level of said V-grooves and horizontally for a distance such that in said limit position of said blocks, said grooves define a channel-like space underlying the space between the adjacent ends of said V-grooves.

* * * * *